United States Patent [19]

Colborn et al.

[11] 4,407,231

[45] Oct. 4, 1983

[54] MOVEMENT ACTIVATED ODOR CONTROL ANIMAL LITTER

[75] Inventors: David W. Colborn, Pleasanton; Thomas S. Coyne, Livermore; Carolyn P. Emrie, Pleasanton; Barbara H. Munk, Berkeley, all of Calif.

[73] Assignee: The Clorox Company, Oakland, Calif.

[21] Appl. No.: 306,466

[22] Filed: Sep. 28, 1981

[51] Int. Cl.³ .................. A01K 1/015; C11B 9/00
[52] U.S. Cl. ........................... 119/1; 264/4; 252/522 A
[58] Field of Search ............. 119/1; 252/316, 522 A; 264/4

[56] References Cited

U.S. PATENT DOCUMENTS

| | | | |
|---|---|---|---|
| 2,895,873 | 7/1959 | Sawyer | 119/1 |
| 3,029,783 | 4/1962 | Sawyer et al. | 119/1 |
| 3,469,439 | 9/1969 | Roberts et al. | 252/316 X |
| 3,516,941 | 6/1970 | Matson | 252/316 |
| 3,636,927 | 1/1972 | Baum | 119/1 |
| 3,675,625 | 7/1972 | Miller et al. | 119/1 |
| 3,743,496 | 7/1973 | Seltzer | 71/21 |
| 3,765,371 | 10/1973 | Fisher | 119/1 |
| 3,816,577 | 6/1974 | Meckermann et al. | 119/1 X |
| 3,828,731 | 8/1974 | White | 119/1 |
| 3,921,581 | 11/1975 | Brewer | 119/1 |
| 3,923,005 | 12/1975 | Fry et al. | 119/1 |
| 4,007,708 | 2/1977 | Yacono | 119/1 |
| 4,009,684 | 3/1977 | Kliment et al. | 119/1 |
| 4,020,156 | 4/1977 | Murray et al. | 252/522 A X |
| 4,085,704 | 4/1978 | Frazier | 119/1 |
| 4,100,103 | 7/1978 | Foris et al. | 252/522 A X |
| 4,126,674 | 11/1978 | Mausner | 252/316 X |
| 4,145,184 | 3/1979 | Brain et al. | 252/522 A X |
| 4,286,020 | 8/1981 | Himel et al. | 264/4 X |

FOREIGN PATENT DOCUMENTS 911826 10/1972 Canada .

OTHER PUBLICATIONS

*Encyclopedia of Chemical Technology*, Kirk-Othmer, pp. 440-445.

B.F. Goodrich Bulletin GC-36 (revised) entitled Carbopol® Water-Soluble Resins, pp. 11, 12, 15-18.

*Primary Examiner*—Robert P. Swiatek
*Attorney, Agent, or Firm*—Majestic, Gallagher, Parsons & Siebert

[57] ABSTRACT

Most conventional animal litters develop malodors fairly quickly. An animal litter in accordance with the present invention selectively releases an odor masking component in response to agitation of the litter by an animal. The animal litter comprises absorbent particles having microcapsules affixed to exterior surfaces of at least some of the absorbent particles. The microcapsules encapsulate the odor masking component, which is released when the microcapsules are ruptured.

19 Claims, 4 Drawing Figures

MOVEMENT ACTIVATED ODOR CONTROL ANIMAL LITTER

BACKGROUND OF THE INVENTION

1. Field of the Invention

The present invention relates to an odor control animal litter, and more particularly to an animal litter having microcapsules affixed to absorbent particles and adapted to selectively release a fragrance or deodorizer.

2. Prior Art

A wide variety of absorbant substrates, normally particulate, are used for animial litters. For example, substrates include cellulosic materials such as sawdust, wood chips, wood shavings, oat hulls, alfalfa (usually pressed or agglomerated), and clay minerals such as kaolinites or montmorillonites. As these animal litters are used, they develop malodors fairly rapidly. Various attempts have been made to mask the malodors and/or to extend the useful life of animal litters.

One direction which has been taken has involved adding a fragrance or deodorizer, by mixing or spraying, to an animal litter. However, these animal litters release their odor masking components continuously, and the odor masking property is relatively rapidly exhausted.

Another approach has been to provide a moisture sensitive release of fragrance. For example, U.S. Pat. No. 3,921,581, inventor Brewer, issued Nov. 25, 1975, discloses a solid excipient having a water-sensitive disintegrant. The solid excipient is designed to disintegrate when the animal litter is moistened by urine. However, this animal litter provides little or no odor masking for feces, and after a period of some use by the animal tends to develop moist clumps of disintegrated particles.

DISCLOSURE OF THE INVENTION

The present invention is directed to overcoming one or more problems set forth above.

In one aspect of this invention, an animal litter comprises a quantity of absorbent particles movable relative each other and having a plurality of microcapsules affixed to exterior surfaces of at least some of the particles. The microcapsules include a fragrance of a deodorizer encapsulated therein, and are adapted to release the fragrance or deodorizer in response to contact between exterior surfaces of the particles during relative movement, or agitation, of the particles.

In another aspect of the present invention, a slurry, usefully sprayed onto a substrate, comprises microcapsules suspended by a suspension agent, an adhesive agent and a liquid carrier. The slurry is particularly adapted to be sprayed onto the absorbant particles to adhesively affix the microcapsules thereon and to form an animal litter as above disclosed.

A litter in accordance with the present invention is useful for a variety of animals, but is particularly well suited as a cat litter. The inventive animal litter preferably has at least about 0.01 wt. % microcapsules with respect to a quantity of absorbant particles, most preferably about 0.1 wt. % to provide excellent odor control/fragrance release over a relatively long period of use. The fragrance or deodorizer is selectively released when the animal moves, or agitates, the particles. For example, a cat normally digs a depression in animal litter, and then covers the depression. During both these times of agitation, at least a portion of the microcapsules affixed to those particles being moved, or agitated, are sufficiently abraded as to rupture, and thus to release their fill contents.

BEST MODE OF CARRYING OUT THE INVENTION

An animal litter in accordance with the present invention provides selectively activated odor control and includes a quantity of absorbant particles. The absorbancy of these particles should be sufficient to absorb urine and to assist in desiccating animal feces. A wide variety of materials are known and useful as the absorbant particles, which may take the form of various regular or irregular shapes and sizes. For example, the absorbant particles may be composed of cellulosic materials such as sawdust, wood chips, wood shavings, oat hulls, alfalfa (usually pressed or agglomerated), synthetic clays, and clay minerals such as kaolinites or montmorillonites. The absorbant particles may be selected from any one, or mixtures, of the various conventional, particulate substrates utilized as animal litters.

The inventive animal litter is suitably used for various animals which bed, or burrow, in the litter, such as gerbils, mice and the like, and for larger animals, especially cats, which primarily use animal litters for their wastes.

Particles of the animal litter are movable relative to each other by the animal while exterior surfaces of the particles are in contacting relationship. That is, when the particles are moved by the animal's burrowing, scratching, or agitating, then the exterior surfaces will rub, or somewhat abrade, against each other.

A plurality of microcapsules are affixed to exterior surfaces of at least some of the particles of the inventive animal litter. The microcapsules are preferably at least about 0.01 wt. % with respect to the quantity of absorbant particles, more preferably will be at least about 0.05 wt. %, and most preferably will be about 0.1 wt. %.

Figure 1:
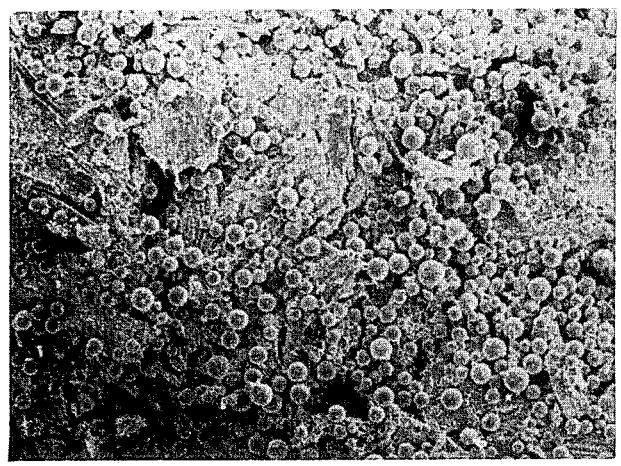
FIG. 1 is a photomicrograph of the exterior surface of an animal litter particle in accordance with the present invention at a magnification of 50×.
Figure 2:
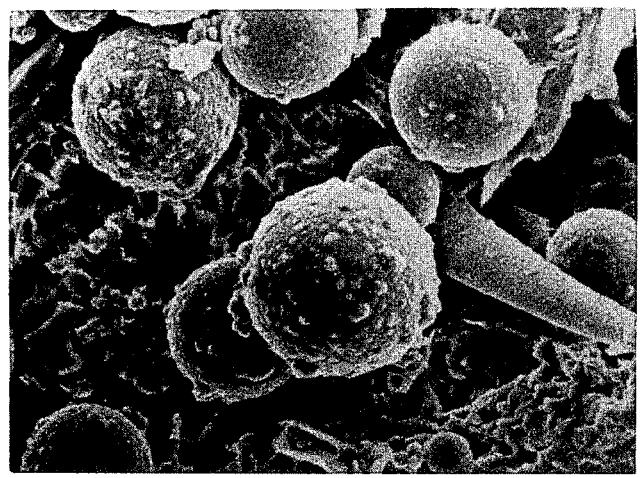
FIG. 2 is a photomicrograph as in FIG. 1, but taken at a magnification of 500×.
Figure 3:
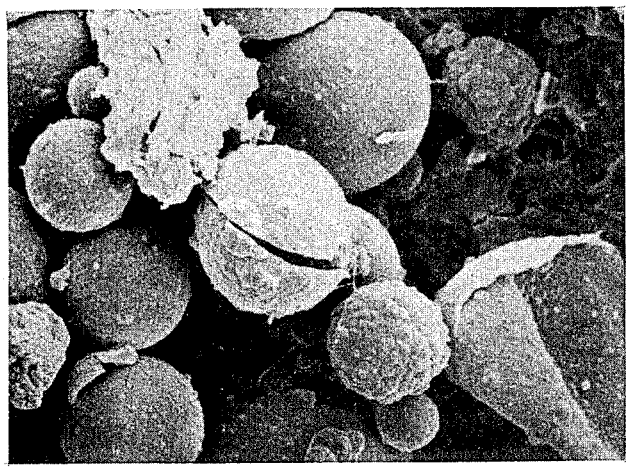
FIG. 3 is a photomicrograph of the exterior surface of another animal litter particle in accordance with the present invention at a magnification of 500×; and, FIG. 4 is a photomicrograph of the exterior surface of a prior art animal litter particle for comparison with the subject invention, taken at a magnification of 50×.
Figure 4:
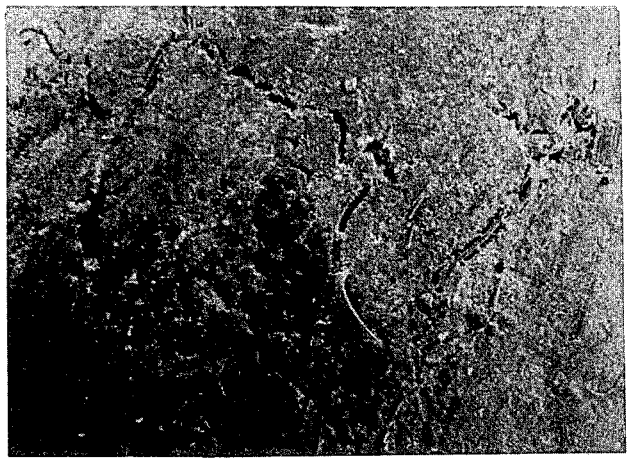

Referring to FIG. 1, the exterior surface of a particle in accordance with the present invention (composed of 75 wt. % oat hulls and 25 wt. % alfalfa) is illustrated with affixed microcapsules ranging in size from about 25 microns to about 100 microns. As illustrated, the microcapsules preferably are in a relatively evenly distributed monolayer upon the surface and are fairly dense. FIG. 2 illustrates an enlarged view of FIG. 1, and shows several microcapsules intactly affixed to the exterior surface. FIG. 3 is similar to FIG. 2, but shows a ruptured microcapsule. For comparison, FIG. 4 illustrates the exterior surface of a prior art particle at the same magnification as the exterior surface illustrated by FIG. 1, but without any affixed microcapsules.

Microcapsules suitable for affixation to the inventive animal litter have a diameter of from about 25 microns to about 200 microns, and more preferably have a diameter of from about 50 microns to about 110 microns. The microcapsules include a fragrance or a deodorizer encapsulated therein, and the fragrance or deodorizer preferably is about 75 weight % to about 85 weight % of the microcapsules.

The microcapsules are adapted to release the fragrance or deodorizer in response to contact between exterior surfaces of the particles during relative movement of the particles, such as occurs during agitation by the animal. This release of fragrance or deodorizer occurs when the microcapsules rupture. Suitable microcapsules rupture when subjected to a force of from about 200 psi (1400 kPa) to about 1600 psi (11000 kPa), more preferably from about 300 psi (2300 kPa) to about 800 psi (5600 kPa).

Microcapsules suitable for affixation to absorbant particles in accordance with the present invention are preferably formed of a substantially water insoluble wall material, such as a ureaformaldehyde polymer. Suitable microcapsules for the present invention can be made, for example, in accordance with the teaching of U.S. Pat. No. 3,516,941, inventor Matson, issued June 23, 1970 (incorporated herein by reference).

The fragrance or deodorizer encapsulated by the microcapsules may be selected from a wide variety of commercially available perfumes, flavors, fragrances, essence oils, and deodorizers, which should be fairly volatile, such as citrus (orange, lemon and the like) oil, oil of cloves, cinnamon oil, pine oil, and so forth.

The frangibility of an animal litter in accordance with the present invention will now be more fully described, followed by a description of a slurry and procedure useful for making the inventive animal litter.

FRANGIBILITY

The affixed microcapsules in accordance with the present invention must be sufficiently frangible as to release their fill material in response to contact between exterior surfaces during relative movement of the particles, but should be sufficiently strong to resist breakage during packaging, shipping and storing of the inventive animal litter. Although some breakage, or rupture, of the affixed microcapsules does tend to occur during packaging, shipping, and storing, sufficient intactly affixed microcapsules in accordance with the invention survive to provide selective fragrance release. At the most preferred level of about 0.1 wt. % microcapsules with respect to the quantity of particles, the inventive animal litter provides an effective fragrance release during about 6 to about 8 days intensive use by an animal, such as an indoor cat.

Example I, below, illustrates the fragrance or deodorizer release properties of animal litters (wherein samples 3-5 are in accordance with the present invention, and samples 1-2 and 6 are for comparison).

EXAMPLE I

Six animal litter compositions (samples 1-6) were prepared which primarily differed by the frangibility of the affixed microcapsules. The particles to which the microcapsules were gluedly affixed were composed of 75 wt. % oat hulls and 25 wt. % alfalfa. One portion of each sample was subjected to agitation and another portion of each sample was not agitated. A mechanical cat's paw attached to a motor was used to reproducably simulate a cat's scratching, or agitation, of the one portions for each of samples 1-6 (100 grams). This simulated scratching was done for a period of 3 seconds for each of the 6 sample portions. An unscratched, or unagitated, six sample portions (100 grams) of animal litter were used as the control. Immediately after agitation by the mechanical cat's paw, a lid was placed on each sample's container, and the sample was allowed to equilibrate for five minutes. The lid was then removed, and the amount of fragrance perceived to be immediately present was noted by a panel on a scale of 0 to 5 (wherein 0 was no perception of fragrance). Compositional parameters are represented by Table I, and results of the fragrance release evaluations are represented by Table II, below.

TABLE I

| Sample No. | Mean Diameter of Microcapsules (μ) | Wt. % Microcapsules with respect to Particles | Vol. % Fragrance Oil per Microcapsule |
|---|---|---|---|
| 1 | 128 | 0.1 | 80.7 |
| 2 | 92 | 0.1 | 77.7 |
| 3 | 92 | 0.1 | 77.7 |
| 4 | 94 | 0.1 | 75.7 |
| 5 | 57 | 0.1 | 77.7 |
| 6 | 12 | 0.1 | 77.7 |

TABLE II

| Sample No. | Frangibility (psi) | Fragrance Release Unagitated Sample | Fragrance Release Agitated Sample |
|---|---|---|---|
| 1 | 135 | 1.5 | 3.0 |
| 2 | 140 | 1.5 | 3.0 |
| 3 | 321 | 0.5 | 3.5 |
| 4 | 324 | 0.5 | 2.5 |
| 5 | 498 | 0.5 | 3.0 |
| 6 | 2264 | 0.5 | 1.5 |

The microcapsules affixed to animal litters of samples 1 and 2 were more frangible (e.g. ruptured well below 200 psi) than is preferred for the inventive animal litter, and as may be seen by the fragrance release data of Table II were believed to be relatively "leaky" even when not agitated. The inventive animal liters illustrated by samples 3-5 provided good fragrance release properties after agitation. The fragrance released was very noticeable, remained noticeable for five minutes, and was still faintly noticeable after ten minutes. The animal litter represented by sample 6 was less frangible (e.g. ruptured considerably above 1600 psi) than desirable for the inventive animal litter, and had a relatively low level of fragrance release after agitation.

For comparison with the inventive animal litter, three comparison compositions were prepared (samples 7-9) which differed from samples 1-6 of Example I by having several different spray dried fragrances admixed with absorbant particles composed of 75 wt. % oat hulls and 25 wt. % alfalfa. 100 g of each sample was subjected to agitation by the mechanical cat's paw, and the samples were evaluated as described by Example I. Results of the fragrance release evaluations are represented by Table III, below.

TABLE III

| Comparison Sample No. | Wt. % Fragrance with Respect to Particles | Fragrance Release Unagitated | Fragrance Release Agitated |
|---|---|---|---|
| 7 | 0.1 | 0.5 | 1.0 |
| 8 | 0.1 | 0.5 | 0.5 |
| 9 | 0.1 | — | 0.5 |

As may be seen by the fragrance release data of Table III, above, spray dried fragrance which is merely admixed with animal litter particles provides little or no selective release in response to agitation.

SLURRY

A slurry, useful for affixing microcapsules to a substrate, includes microcapsules, a suspension agent, an adhesive agent, and a solvent, or carrier liquid. Optional components, such as a dye may be included if desired. The slurry is particularly adapted to be sprayed onto absorbant particles to form the inventive animal litter, and may be, for example, separately packaged in a suitable spray dispenser for spraying onto litter particles by an animal's owner.

Microcapsules of the slurry preferably have a diameter of from about 25 microns to about 200 microns, more preferably from about 50 microns to about 110 microns, are preferably formed of a subtantially water insoluble wall material, and are preferably in an amount from about 0.4 wt. % up to about 30 wt. % of the slurry, more preferably from about 4 wt. % to about 20 wt. % of the slurry. The microcapsules have a fragrance or a deodorizer component encapsulated therein, and are suspended in the slurry by a suspension agent.

The suspension agent should be in a sufficient amount to suspend the microcapsules so that they are fairly evenly dispersed to form a relatively evenly distributed monolayer upon the substrate's surface when the slurry is sprayed thereon. More particularly, for commercial preparation of the inventive animal litter, the suspension agent should be in a sufficient amount to provide suspension stability for the slurry (e.g. prevent separation, or settling, of the microcapsules in the slurry), so that the slurry may be pumped and sprayed in metered amounts over a period of time. That is, the suspension agent preferably provides a stably suspended slurry for at least about 12 hours, more preferably for greater than about 24 hours. The suspension agent should be dispersible in the composition, and preferably thickens the slurry to a viscosity of at least about 100 centipoise (0.1 Pa.s).

Preferred materials for use as the suspension agent are polyacrylic acids, such as are available from B. F. Goodrich as Carbopol and from Rohm & Haas as Acrysol, which are very effective in stably suspending microcapsules of the slurry at levels as low as about 0.20 wt. % with respect to the weight of microcapsules in the slurry.

Two slurry compositions in accordance with the present invention are illustrated by Table IV, below, and another three slurry compositions, illustrated by Table V, below illustrate the suspension stability provided in accordance with the present invention.

TABLE IV

| Composition No. | Components (wt. %) |
|---|---|
| 1 | Suspension Agent* (0.08) |
|   | Microcapsules (0.4) |
|   | 5% NaOH (0.40) |
|   | Adhesive Agent** (0.60) |
|   | Dye (0.10) |
|   | Remainder Water |
| 2 | Suspension Agent* (0.04) |
|   | Microcapsules (20.0) |
|   | 5% NaOH (6.25) |
|   | Adhesive Agent** (3.00) |
|   | Dye (0.10) |
|   | Remainder Water |

*Carbopol 941
**DuPont neoprene latex 735A

TABLE V

| Composition No. | Components (wt. %) | Suspension Stability 12 Hrs. | 24 Hrs. |
|---|---|---|---|
| 3 | suspension agent* (0.05) microcapsules** (25.0) adhesive agent*** (16.5) remainder water | Stable | Not Stable |
| 4 | suspension agent* (0.10) microcapsules** (25.0) adhesive agent*** (15.0) remainder water | Stable | Stable |
| 5 | suspension agent* (0.5) microcapsules** (25.0) adhesive agent*** (25.0) remainder water | Stable | Stable |

*Carbopol 941 (neutralized in solution with 5% NaOH)
**diameters between about 50–110 microns
***neoprene latex (from DuPont as 735A), as % of microencapsule wt.

The above slurry compositions 1–5 in accordance with the present invention were formed by dispersing the suspension agent in water, neutralizing the solution (e.g. to a pH of about 6.7 to about 8), and then admixing the microcapsules and adhesive agent to form an aqueous slurry, which was pumpable and could be sprayed in measured amounts onto a substrate.

The inventive slurry must include a suitable adhesive agent in a sufficient amount to affix the microcapsules to the substrate when the slurry is sprayed thereon. More particularly, suitable adhesive agents will function to form a bond between the microcapsules and exterior surfaces of the substrates which is strong enough to affix and hold at least a major portion of the microcapsules onto the substrate during handling, such as shaking, pouring and the like, as is encountered in packaging procedures.

Sufficient of the adhesive agent is preferably an amount of at least about 9 wt. % with respect to the amount of microcapsules in the slurry. Preferred adhesive agents include acrylic emulsions (such as are commercially available from Rohm & Haas as Rhoplex AC 61) and neoprene latexes. A particularly preferred adhesive agent is neoprene latex 735A, commercially available from DuPont.

The carrier liquid must be compatible with the microcapsules. That is, the microcapsules should be substantially unaffected, or inert, in the liquid. Preferred carrier liquids include water and nonpolar organic solvents. Also, the suspension agent and adhesive agent should be dispersible in the carrier liquid. Water is the most preferred carrier liquid.

The adherence of microcapsules to exterior surfaces of absorbant particles is illustrated by Example II, below.

EXAMPLE II

Six slurries were prepared as described for slurry composition 4 of Table V, but with the differences that the wt. % of adhesive agent was varied, and that several different types of adhesive agents were utilized. Each of these six slurries was sprayed onto quantities of absorbant particles (composed of 75 wt. % oat hulls and 25 wt. % alfalfa), and the resultant six samples allowed to dry for 15 seconds. The six samples were then gently shaken and poured out of the container to leave those microcapsules behind. The weight of the loose microcapsules and the percent of microcapsules still affixed (e.g. retained) was determined. The data is presented by Table VI, below.

TABLE VI

| Composition No. | Adhesive Agent (wt. %) | Wt. % Microcapsule Loading on Substrate | Microcapsule Loss After Shaking | Microcapsule Adhesion |
|---|---|---|---|---|
| 6 | polyethylene resin* (35.0) | 1.25 | 70% | 30% |
| 7 | polyethylene resin** (35.0) | 0.85 | 62% | 38% |
| 8 | acrylic emulsion*** (35.0) | 0.95 | 21% | 79% |
| 9 | neoprene latex**** (35.0) | 1.1 | 11% | 89% |
| 10 | neoprene latex**** | 4.2 | 5% | 95% |
| 11 | neoprene latex**** | 3.3 | 14% | 86% |

*obtained from Rohm & Haas as Poly-em 20
**obtained from Rohm & Haas as Poly-em 40
***obtained from Rohm & Haas as Rhoplex AC 61
****obtained from DuPont as 735A The adhesive agent utilized in compositions 6 and 7 was less preferred than those utilized in compositions 8–11 due to the significantly lower microcapsule adhesion which resulted after the slurry had been sprayed onto the particles. Also, the adhesive agent utilized in preparing compositions 8–11 was compatible with, that is did not disrupt, the stability of the slurry, and was homogeneously dispersed as it dissolved in the aqueous carrier.

In another test of adherence, several different slurries in accordance with the invention were formulated with about 0.04 wt. % suspension agent (Carbopl 941), which was neutralized with about 0.32 wt. % of 5% NaOH, about 16.20 wt. % microcapsules, and an adhesive agent (DuPont latex 735A) which varied from about 2.5 wt. % to about 8 wt. % of the composition, and the balance being water. Sufficient quantities of these slurries were sprayed upon conventional clay particles as to affix about 0.4 wt. % microcapsules with respect to the clay particles. 100 gram samples of each were then incorporated into a bale and put through a simulated rail transport test, plus a shock test which involved two 6 inch (15 cm) drops, one 12 inch (31 cm) drop, and one 25 inch (64 cm) drop. Portions of each sample were then examined under an optical stereo microscope to determine the percent of microcapsules remaining affixed on the clay substrate. From about 50% to about 95% of the microcapsules remained affixed in the majority of samples tested.

INDUSTRIAL APPLICABILITY

An animal litter in accordance with the present invention is preferably formed by spraying metered quantities of the slurry onto a quantity of absorbant particles to substantially intactly affix the frangible microcapsules onto at least some of these absorbant particles. The slurry may be pumped with a conventional metering pump and sprayed through a plurality of conventional spray nozzles onto an evenly distributed bed of absorbant particles being moved, as by a conveyor belt, past the spray nozzles. The moving bed of absorbant particles is preferably fairly thin, for example about ½" (1.3 cm) to about 1½" (3.8 cm), so that a significant number of the quantity of particles have affixed microcapsules, and to aid in homogeneous dispersion of the particles with affixed microcapsules in packaging.

A particularly preferred slurry formation has a composition of about 0.06 wt. % Carbopol 941, about 0.29 wt. % of 5% NaOH, about 4.00 wt. % of microcapsules, about 0.60 wt. % of neoprene latex, about 0.10 wt. % of a water soluble dye, and the balance water. This slurry formulation has a pH of about 6.74, a viscosity of about 225 centipoise, and is especially suitable for large scale preparation of the inventive animal litter.

For example, about 7.4 gallons ($28 \times 10^{-3}$ m$^3$) of this slurry per ton (910 kg) of absorbant clay particles privides about 0.12 wt. % microcapsules affixed thereto.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. An animal litter, useful for selectively activated odor control, comprising:
   a quantity of absorbant particles, said particles having exterior surfaces, said particles being movable relative to each other while exterior surfaces of said particles are in contacting relationships; and,
   a plurality of microcapsules affixed to exterior surfaces of at least some of said particles, said microcapsules including a fragrance or a deodorizer encapsulated therein, said microcapsules adapted to release said fragrance or said deodorizer in response to contact between exterior surfaces of said particles during relative movement thereof.

2. The animal litter as in claim 1 wherein:
   said at least some of said particles having said microcapsules affixed thereto are dispersed throughout said quantity of particles, and said microcapsules are at least about 0.01 wt. % with respect to said quantity of absorbant particles.

3. The animal litter as in claim 1 wherein:
   said plurality of microcapsules are substantially water insoluble and are affixed to exterior surfaces of said at least some of said particles by an adhesive agent.

4. The animal litter as in claim 3 wherein:
   said microcapsules have a diameter of from about 25 microns to about 200 microns and are at least about 0.05 wt. % with respect to said quantity of absorbant particles.

5. The animal litter as in claim 4 wherein:
   said fragrance or deodorizer is about 75 wt. % to about 85 wt. % of said microcapsules.

6. The animal litter as in claim 1 or 2 wherein:
   said microcapsules rupture at about 200 psi to about 1600 psi.

7. The animal litter as in claim 6 wherein:
   said microcapsules have a diameter of from about 50 microns to about 110 microns.

8. An animal litter formed by the steps comprising:
   providing a quantity of absorbant particles;
   suspending a quantity of frangible microcapsules containing a fragrance or a deodorizer in a carrier liquid to form a slurry, said slurry including an adhesive agent; and, spraying the slurry having said frangible microcapsules suspended therein onto at least some of said absorbant particles to substantially intactly affix said frangible microcapsules onto said at least some of said particles.

9. The animal litter formed by the steps as in claim 8 wherein:
the frangible microcapsules of the suspending step will rupture at about 200 psi to about 1600 psi.

10. The animal litter formed by the steps as in claim 8 wherein:
the slurry of the spraying step has frangible microcapsules suspended therein and includes from about 1 wt. % to about 30 wt. % of solid frangible microcapsules.

11. A slurry for being sprayed onto a substrate, comprising:
microcapsules in an amount of from about 1 wt. % to about 30 wt. % of the slurry, said microcapsules having a fragrance component or a deodorizer component encapsulated therein;
a suspension agent in a sufficient amount to suspend said microcapsules in the slurry;
an adhesive agent, said adhesive agent including a neoprene latex or an acrylic emulsion, said adhesive agent being in an amount of at least about 9 wt. % with respect to the amount of microcapsules of the slurry, and for affixing the microcapsules to a substrate when sprayed thereon; and,
a carrier liquid in which said microcapsules, suspension agent and adhesive agent are dispersed, and in which said microcapsules are substantially inert.

12. The slurry as in claim 11 wherein:
said suspension agent includes at least about 0.2 wt. % neutralized polyacrylic acid with respect to the amount of microcapsules.

13. The slurry as in claim 12 wherein:
said adhesive agent is dissolved in the carrier liquid.

14. The slurry as in claim 13 wherein:
said adhesive agent is neoprene latex.

15. The slurry as in claim 13 wherein:
said carrier liquid includes water or a nonpolar organic solvent, and said slurry has a pH of from about 6.7 to about 8.

16. The slurry as in claim 13 wherein said microcapsules are frangible and will rupture at about 200 psi to about 1600 psi.

17. The slurry as in claim 13 wherein said microcapsules have a diameter of from about 25 microns to about 200 microns and are substantially water insoluble.

18. The slurry as in claim 13 wherein said fragrance or deodorizer is about 75 wt. % to about 85 wt. % of said microcapsules.

19. A slurry useful for affixing microcapsules to a substrate by spraying the slurry thereon, comprising:
a quantity of substantially intact, frangible microcapsules having a diameter of from about 50 microns to about 110 microns and rupturing at about 200 psi to about 1600 psi, the quantity of microcapsules being from about 4 wt. % to about 20 wt. % of the slurry;
a suspension agent providing a slurry viscosity of from about 100 centipoise to about 225 centipoise;
an adhesive agent in an amount of at least about 9 wt. % with respect to the microcapsules of the slurry; and
a carrier liquid in which said microcapsules, suspension agent and adhesive agent are dispersed.

* * * * *

UNITED STATES PATENT AND TRADEMARK OFFICE
CERTIFICATE OF CORRECTION

PATENT NO. : 4,407,231

DATED : Oct. 4, 1983

INVENTOR(S) : Colborn et al.

It is certified that error appears in the above-identified patent and that said Letters Patent is hereby corrected as shown below:

Col. 1, line 9: "absorbent" should be --absorbant".

Col. 1, line 13: "animial" should be --animal--.

Col. 1, line 41: "absorbent" should be --absorbant--.

Col. 1, line 44: "of" should be --or--.

Col. 4, line 42: "liters" should be --litters--.

Col. 9, line 15: "solid" should be --said--.

Signed and Sealed this

Twenty-seventh Day of December 1983

[SEAL]

Attest:

Attesting Officer

GERALD J. MOSSINGHOFF

Commissioner of Patents and Trademarks